(12) United States Patent
Cheng et al.

(10) Patent No.: US 9,019,352 B2
(45) Date of Patent: *Apr. 28, 2015

(54) TWO-PARALLEL-CHANNEL REFLECTOR WITH FOCAL LENGTH AND DISPARITY CONTROL

(75) Inventors: Fuhua Cheng, Lexington, KY (US); Shang Te Tu, Hsinchu (TW)

(73) Assignee: Amchael Visual Technology Corp., Hsinchu (TW)

( * ) Notice: Subject to any disclaimer, the term of this patent is extended or adjusted under 35 U.S.C. 154(b) by 355 days.

This patent is subject to a terminal disclaimer.

(21) Appl. No.: 13/301,293

(22) Filed: Nov. 21, 2011

(65) Prior Publication Data

US 2013/0128005 A1 May 23, 2013

(51) Int. Cl.
*G03B 35/10* (2006.01)
*H04N 13/02* (2006.01)
*G03B 17/17* (2006.01)

(52) U.S. Cl.
CPC ............ *G03B 35/10* (2013.01); *H04N 13/0217* (2013.01); *G03B 17/17* (2013.01)

(58) Field of Classification Search
CPC ..... G03B 17/17; G03B 35/10; H04N 13/0217
See application file for complete search history.

(56) References Cited

U.S. PATENT DOCUMENTS

| | | |
|---|---|---|
| 2,314,174 A | 3/1943 | Steinman |
| 3,184,630 A | 5/1965 | Geer |
| 4,475,126 A | 10/1984 | Akins |
| 4,568,970 A | 2/1986 | Rockstead |
| 4,687,310 A | 8/1987 | Cuvillier |
| 4,751,570 A | 6/1988 | Robinson |
| 5,349,403 A | 9/1994 | Lo |
| 5,461,495 A | 10/1995 | Steenblik et al. |
| 5,532,777 A | 7/1996 | Zanen |
| 5,546,226 A | 8/1996 | Herington |
| 5,570,150 A | 10/1996 | Yoneyama et al. |
| 5,727,242 A | 3/1998 | Lo et al. |
| 5,757,548 A | 5/1998 | Shimomukai |
| 5,828,913 A | 10/1998 | Zanen |
| 5,835,133 A | 11/1998 | Moreton et al. |
| 5,883,662 A * | 3/1999 | Zanen ........................... 348/49 |
| 5,892,994 A | 4/1999 | Inaba |
| 6,122,597 A | 9/2000 | Saneyoshi et al. |
| 6,208,813 B1 | 3/2001 | Carlsson et al. |
| 6,278,460 B1 | 8/2001 | Myers et al. |

(Continued)

OTHER PUBLICATIONS

Non-Final Office Action for U.S. Appl. No. 13/427,641 dated Apr. 23, 2014.

(Continued)

*Primary Examiner* — Dave Czekaj
*Assistant Examiner* — Mohammad J Rahman
(74) *Attorney, Agent, or Firm* — King & Schickli, LLC

(57) ABSTRACT

A two-parallel-channel reflector (TPCR) with focal length and disparity control is used after being combined with an imaging device. A left parallel channel and a right parallel channel are formed in the TPCR, so that the imaging device can synchronously perform an imaging operation on a left side view and a right side view of a scene, so as to obtain a stereoscopic image. Each parallel channel is bounded by two curved reflecting mirrors, so that captured light rays may be parallelly reflected in the channel, and an operator may adjust a convergence angle and an interocular distance between the left side view and the right side view, so as to control the focal length and disparity during imaging as require.

16 Claims, 11 Drawing Sheets

(56) References Cited

U.S. PATENT DOCUMENTS

| | | | |
|---|---|---|---|
| 6,643,396 B1 | 11/2003 | Hendriks et al. | |
| 6,665,003 B1 * | 12/2003 | Peleg et al. | 348/36 |
| 6,668,082 B1 | 12/2003 | Davison et al. | |
| 6,791,598 B1 * | 9/2004 | Luken et al. | 348/36 |
| 6,819,488 B2 * | 11/2004 | Zanen | 359/464 |
| 6,915,073 B2 | 7/2005 | Seo | |
| 6,963,661 B1 | 11/2005 | Hattori et al. | |
| 6,996,339 B2 | 2/2006 | Miyoshi et al. | |
| 7,061,532 B2 | 6/2006 | Silverstein | |
| 7,065,242 B2 | 6/2006 | Petrov et al. | |
| 7,075,735 B2 | 7/2006 | Nozawa et al. | |
| 7,106,365 B1 | 9/2006 | Sogawa | |
| 7,132,933 B2 | 11/2006 | Nakai et al. | |
| 7,170,677 B1 | 1/2007 | Bendall et al. | |
| 7,181,136 B2 | 2/2007 | Perisic | |
| 7,263,209 B2 | 8/2007 | Camus et al. | |
| 7,274,800 B2 | 9/2007 | Nefian et al. | |
| 7,362,881 B2 | 4/2008 | Hattori et al. | |
| 7,420,750 B2 | 9/2008 | Kuthirummal et al. | |
| 7,606,485 B2 | 10/2009 | Ohashi | |
| 7,710,451 B2 * | 5/2010 | Gluckman et al. | 348/46 |
| 7,877,706 B2 | 1/2011 | Albertson et al. | |
| 7,899,321 B2 | 3/2011 | Cameron et al. | |
| 8,085,293 B2 * | 12/2011 | Brodsky et al. | 348/49 |
| 8,267,781 B2 | 9/2012 | Geiss | |
| 8,325,978 B2 | 12/2012 | Chai et al. | |
| 8,351,651 B2 | 1/2013 | Lee | |
| 8,396,252 B2 | 3/2013 | El Dokor | |
| 8,417,026 B2 | 4/2013 | Wu et al. | |
| 2001/0020976 A1 * | 9/2001 | Peleg et al. | 348/36 |
| 2001/0053287 A1 | 12/2001 | Inaba | |
| 2003/0072569 A1 * | 4/2003 | Seo | 396/331 |
| 2003/0072570 A1 * | 4/2003 | Seo | 396/331 |
| 2003/0133707 A1 * | 7/2003 | Perisic | 396/324 |
| 2003/0156187 A1 | 8/2003 | Gluckman et al. | |
| 2004/0189720 A1 | 9/2004 | Wilson et al. | |
| 2004/0252863 A1 | 12/2004 | Chang et al. | |
| 2005/0057806 A1 | 3/2005 | Nozawa et al. | |
| 2005/0185050 A1 | 8/2005 | Ohashi | |
| 2005/0254817 A1 | 11/2005 | McKee | |
| 2006/0077543 A1 | 4/2006 | Miyoshi et al. | |
| 2006/0082879 A1 | 4/2006 | Miyoshi et al. | |
| 2006/0115119 A1 | 6/2006 | Nagaoka et al. | |
| 2006/0204038 A1 | 9/2006 | Yokota et al. | |
| 2007/0165306 A1 | 7/2007 | Bendall et al. | |
| 2007/0188603 A1 * | 8/2007 | Riederer et al. | 348/54 |
| 2008/0031514 A1 | 2/2008 | Kakinami | |
| 2009/0168152 A1 | 7/2009 | Gelernt et al. | |
| 2010/0289874 A1 | 11/2010 | Cheng | |
| 2010/0321477 A1 * | 12/2010 | Iwasaki | 348/49 |
| 2012/0057000 A1 * | 3/2012 | Rohaly et al. | 348/49 |
| 2012/0320165 A1 * | 12/2012 | Schuck | 348/49 |
| 2013/0063336 A1 | 3/2013 | Sugimoto et al. | |

OTHER PUBLICATIONS

Final Office Action issued in U.S. Appl. No. 12/885,810 dated Jul. 8, 2013.

International Search Report and Written Opinion for International Application No. PCT/US2011/040247 dated Oct. 7, 2011.

Non-Final Office Action issued in U.S. Appl. No. 12/885,810 dated Jan. 16, 2014.

Non-Final Office Action issued in U.S. Appl. No. 12/885,810 dated Jul. 3, 2014.

Non-Final Office Action issued in U.S. Appl. No. 12/885,810 dated Nov. 15, 2012.

"Rectify," the Free Merriam-Webster Dictionary, "http://merriam-webster.com/dictionary/rectify," Jul. 24, 2014.

Final Office Action issued in U.S. Appl. No. 13/427,641 dated Jul. 29, 2014.

* cited by examiner

TWO-PARALLEL-CHANNEL REFLECTOR WITH FOCAL LENGTH AND DISPARITY CONTROL

BACKGROUND OF THE INVENTION

1. Field of Invention

The present invention relates to a two-parallel-channel reflector (TPCR) with focal length and disparity control, capable of capturing a dual-view image (a left side view and a right side view) of a scene after being combined with an imaging device, so as to generate a stereoscopic image, with the ability of focal length and disparity control. More particularly, a TPCR with focal length and disparity control has two parallel channels that allow an imaging device to capture a left side view and a right side view of a scene synchronously; each parallel channel is bounded by a curved outward reflecting mirror and a curved inward reflecting mirror that enables light rays into the channel to be parallelly reflected inside the channel. With the parallel channels, operators may adjust the interocular distance between the outward reflecting mirrors and the convergence angle between the view directions of the outward reflecting mirrors, so as to control the disparity and focal length during the imaging operation, without changing the dimension of the reflector.

2. Related Art

Conventional computer stereo vision uses two or more cameras to shoot images of the same scene from different view angles. The imaging devices are separated by a distance, like human eyes. The computer then calculates the depth of an object in the scene by comparing images shot by the two different cameras. This is done by shifting one image on top of the other one to find the parts that match. The shifted amount is called the disparity. The disparity at which objects in the images best match is used by the computer to calculate their depths.

A multi-view imaging system uses only one camera to calculate the depth of an object. In most cases, such a system includes specially designed mirrors to create virtual cameras. With the views captured by the physical camera and the virtual cameras, the computer can use the same scheme as in conventional computer stereo vision to calculate the depth of an object.

FIG. 1 is a schematic constitutional view of a two-channel multi-view imaging system patented by Andre Redert and Emile Hendriks in 2003. Referring to FIG. 1, a hand held camera 11 is mounted on a reflector 12 patented by Pieter O. Zanen which has a left imaging channel 121 and a right imaging channel 122 and each channel is bounded by two flat reflecting mirrors. As shown in FIG. 1, the left imaging channel 121 is bounded by a left side inward mirror 1211 and a left side outward mirror 1212, and the right imaging channel 122 is bounded by a right side inward mirror 1221 and a right side outward mirror 1222. Light rays L1 into the left imaging channel 121 reach the left side outward mirror 1212, are reflected to the left side inward mirror 1211, and are then reflected to the camera 11. Light rays L2 into the right imaging channel 122 reach the right side outward mirror 1222, are reflected to the right side inward mirror 1221, and are then reflected to the camera 11. Hence, an image generated by Redert/Hendricks' imaging system 1 contains two views of the scene, a left view and a right view.

A disadvantage of Zanen's two-channel reflector is that operators cannot adjust the disparity of the reflector. For the solution of this situation, operators need to adjust the distance between the two outward mirrors, and this requires the capability of changing the dimension of the outward mirrors dynamically, because the dimension of an outward mirror is proportional to the distance between the outward mirror and the corresponding inward mirror. For an example in FIG. 2, as the left outward mirror 1212 moves to the left farther, the thickness d1 becomes larger, and this affects the entire dimension of the two-channel reflector directly. Another disadvantage of Zanen's reflector is unable to control the convergence angle of the reflector.

FIG. 3 is a schematic view of a two-channel reflector patented by Shuzo Seo in 2005; this is an improvement of Andre Redert and Emile Hendriks' approach. Referring to FIG. 3, a mechanism is added to the two-channel reflector so that the outward mirrors can be rotated synchronously about the pivot points respectively. This rotation process is automatically performed when the lens of the camera is zoomed. As a result, the focal length of the two-channel reflector can be automatically adjusted when the lens of the camera is zoomed. This is an important invention on single-lens, multi-view imaging process. But due to the fact that flat mirrors are used for both outward reflecting and inward reflecting, Seo's invention cannot adjust disparity of the reflector either.

SUMMARY OF THE INVENTION

In view of the above problems, the present invention is mainly directed to a TPCR with focal length and disparity control that is capable of being miniaturized and controlling the disparity and focal length.

In order to achieve the above objectives, the present invention mainly uses two outward reflecting units and two corresponding inward reflecting units to construct two imaging channels. In addition, the outward reflecting units and the inward reflecting units are each formed by curved reflecting mirrors, so that light rays are parallelly reflected in reflecting paths formed between the outward reflecting units and the inward reflecting units. In this manner, the thickness and height of the imaging channels may be greatly reduced, so as to meet the requirements for miniaturization. Further, with the parallel reflecting paths, in the present invention, the outward reflecting units may be designed to have a distance adjusting function and an angle adjusting function, so as to control the disparity and focal length during imaging by controlling the interocular distance between the outward reflecting units and the convergence angle between the optical centers (or, view directions) of the outward reflecting units.

BRIEF DESCRIPTION OF THE DRAWINGS

The present invention will become more fully understood from the detailed description given below for illustration only, and thus are not limitative of the present invention, and wherein.

DETAILED DESCRIPTION OF THE INVENTION

Figure 1:
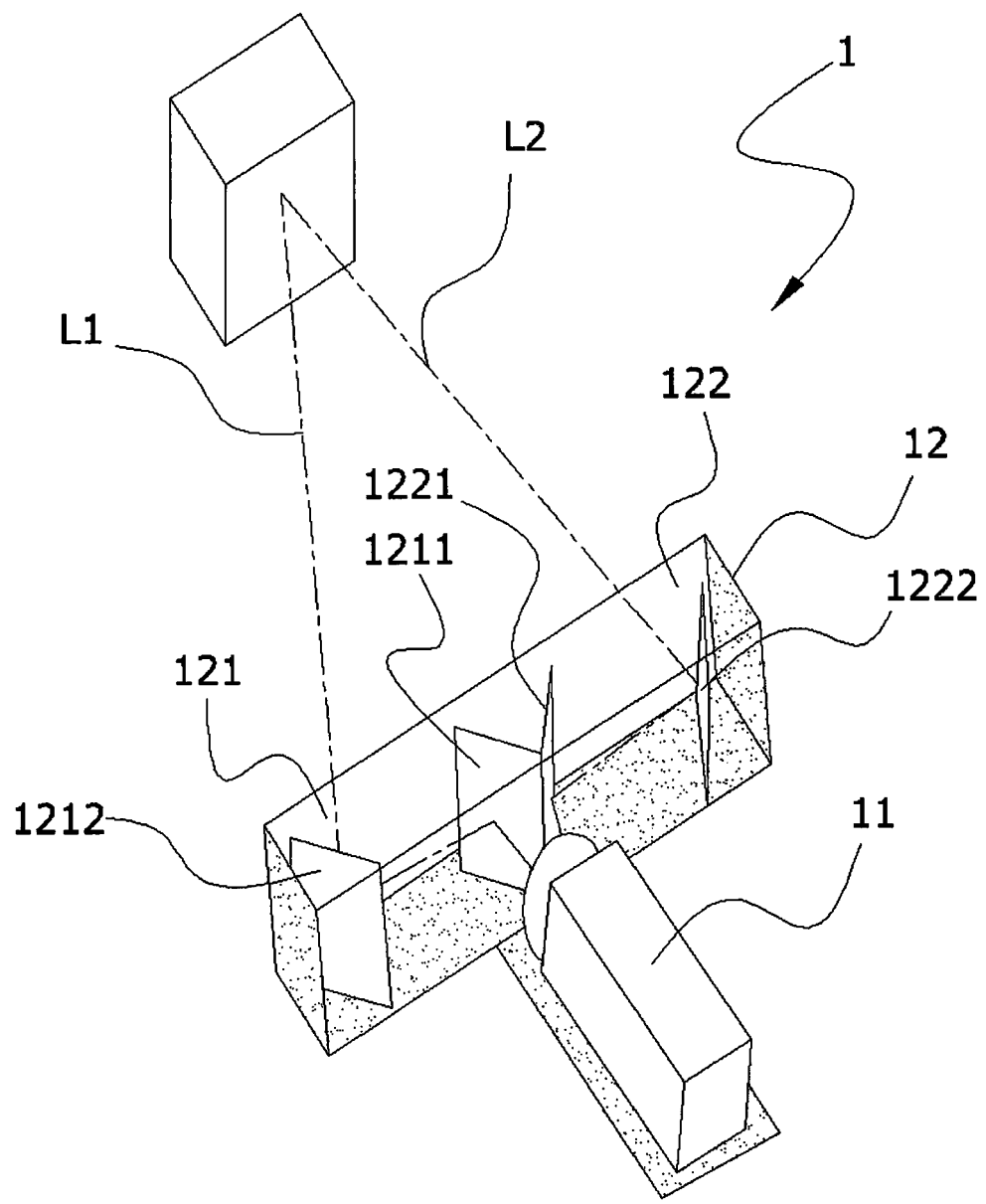
FIG. 1 is a schematic constitutional view of Redert and Hendriks' imaging system.
Figure 2:
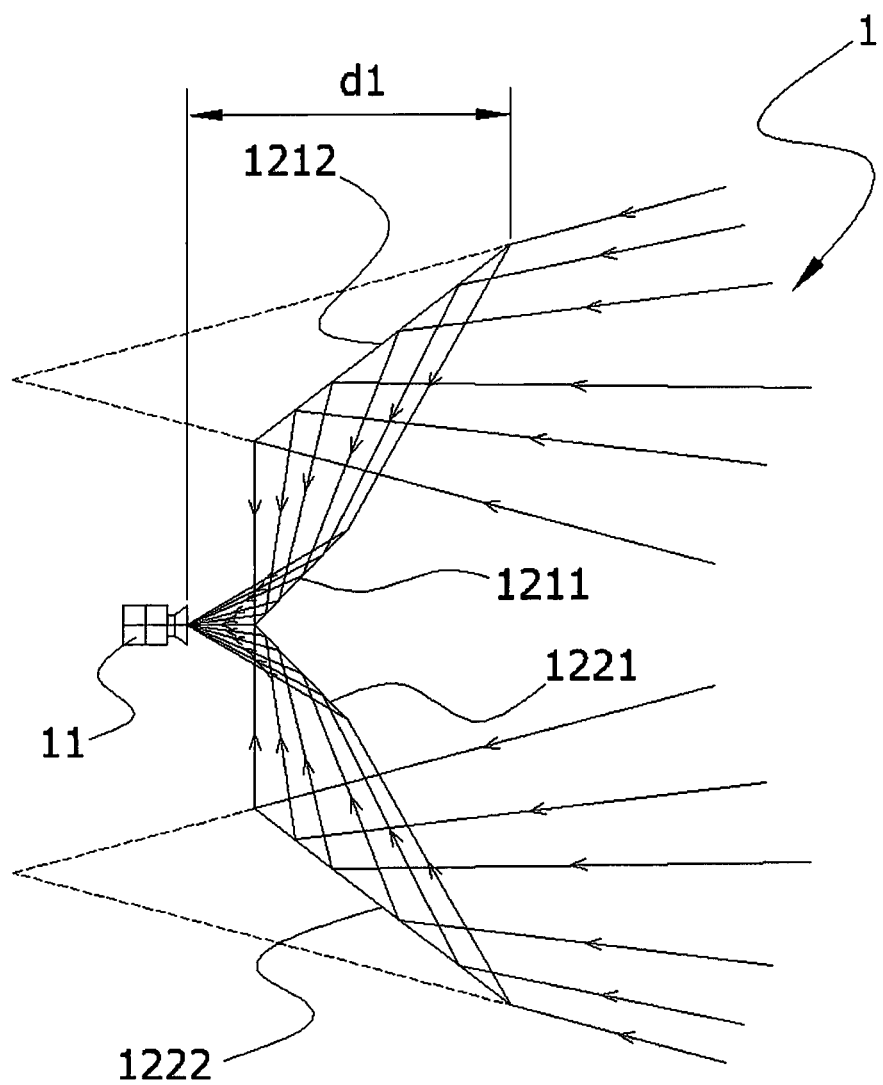
FIG. 2 is a schematic view of optical paths of Redert and Hendriks' imaging system.
Figure 3:
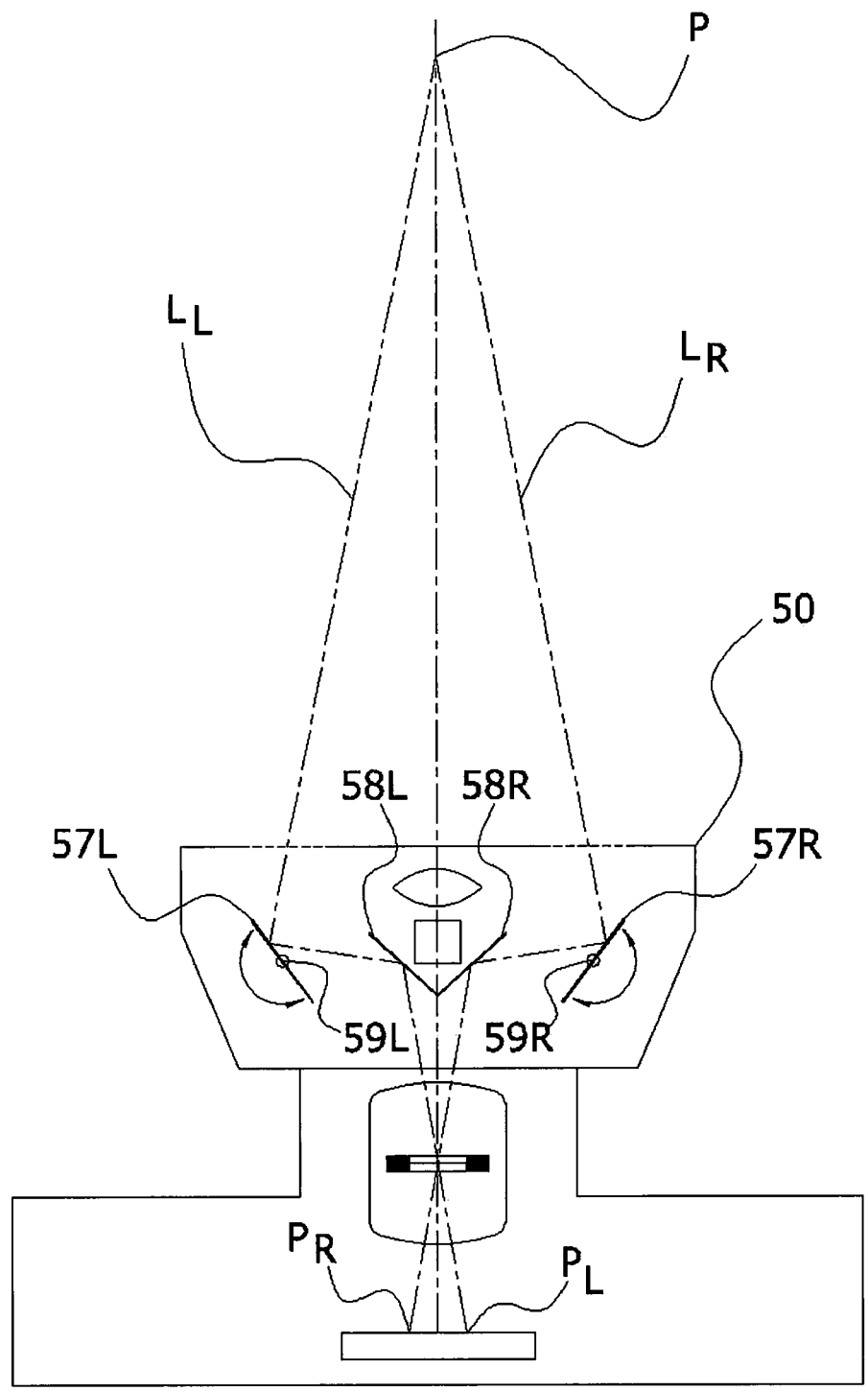
FIG. 3 is a schematic view of Shuzo Seo's imaging system.
Figure 4:
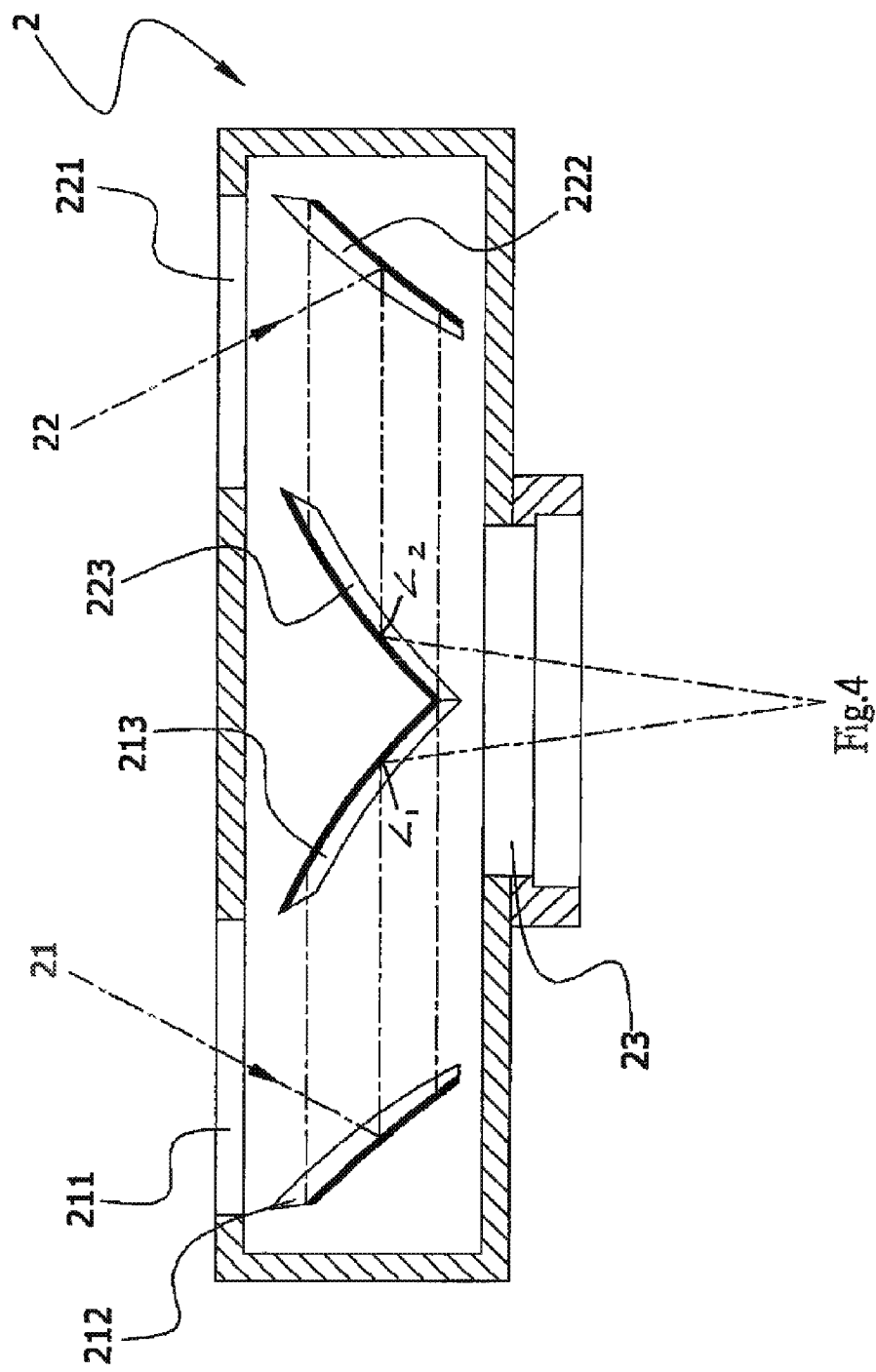
FIG. 4 is a schematic constitutional view of the present invention.

FIG. 4 is a schematic constitutional view of the present invention. Referring to FIG. 4, a TPCR with focal length and disparity control 2 according to the present invention is mainly constructed by a left side imaging channel 21, a right side imaging channel 22, and a central image inlet 23. An end of the left side imaging channel 21 and an end of the right side imaging channel 22 are connected to the central image inlet 23. The left side imaging channel 21 is constructed by a left side image inlet 211, a left side outward reflecting unit 212, and a left side inward reflecting unit 213. The right side imaging channel 22 is constructed by a right side image inlet 221, a right side outward reflecting unit 222, and a right side inward reflecting unit 223. As shown in FIG. 4, the left side outward reflecting unit 212, the right side outward reflecting unit 222, the left side inward reflecting unit 213, and the right side inward reflecting unit 223 are curved reflecting mirrors, for enabling light rays to be fully parallelly reflected after respectively entering the left side imaging channel 21 and the right side imaging channel 22.

Figure 5:
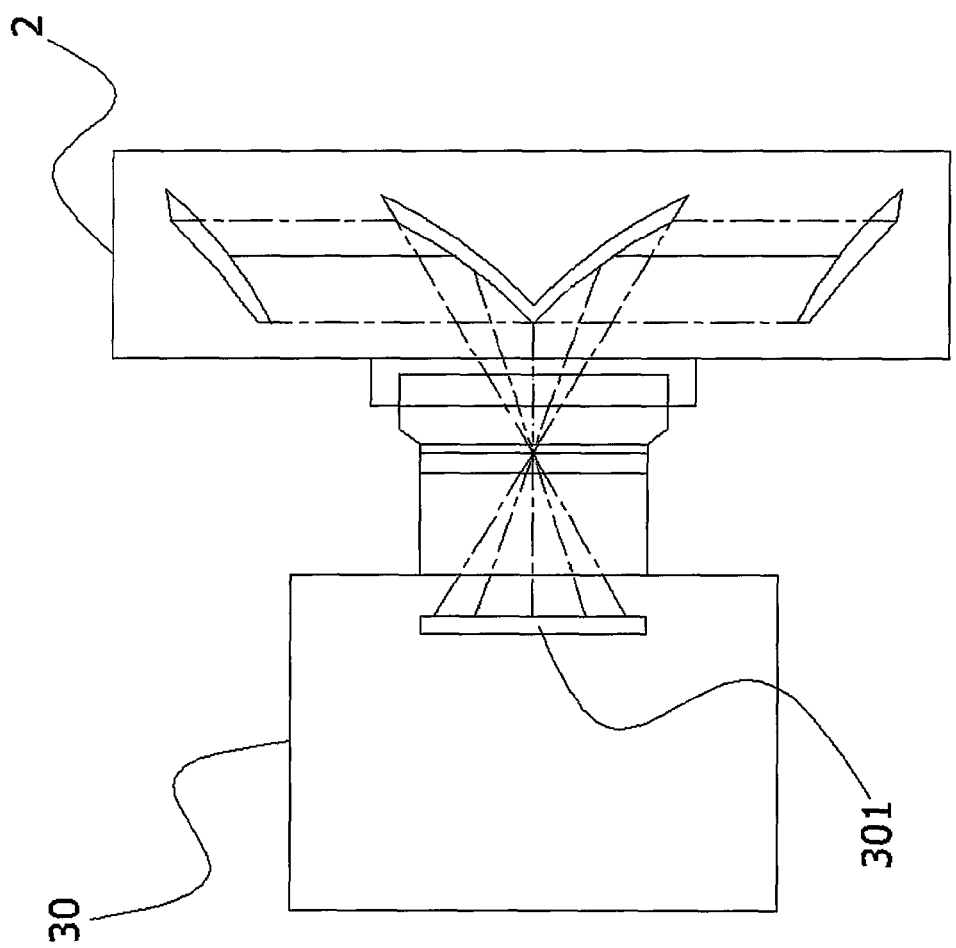
FIG. 5 is a schematic view I of the implementation of the present invention.
Figure 6:
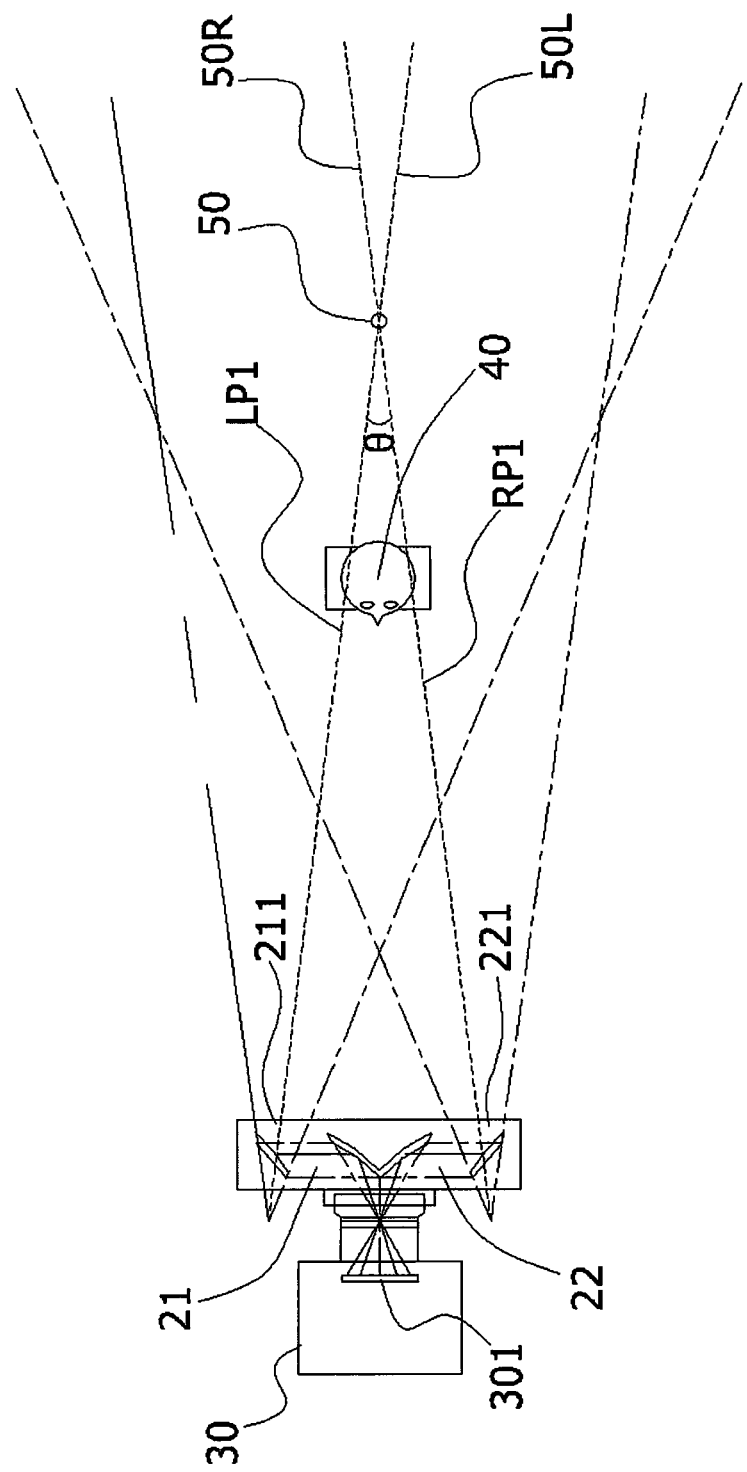
FIG. 6 is a schematic view II of the implementation of the present invention.
Figure 7:
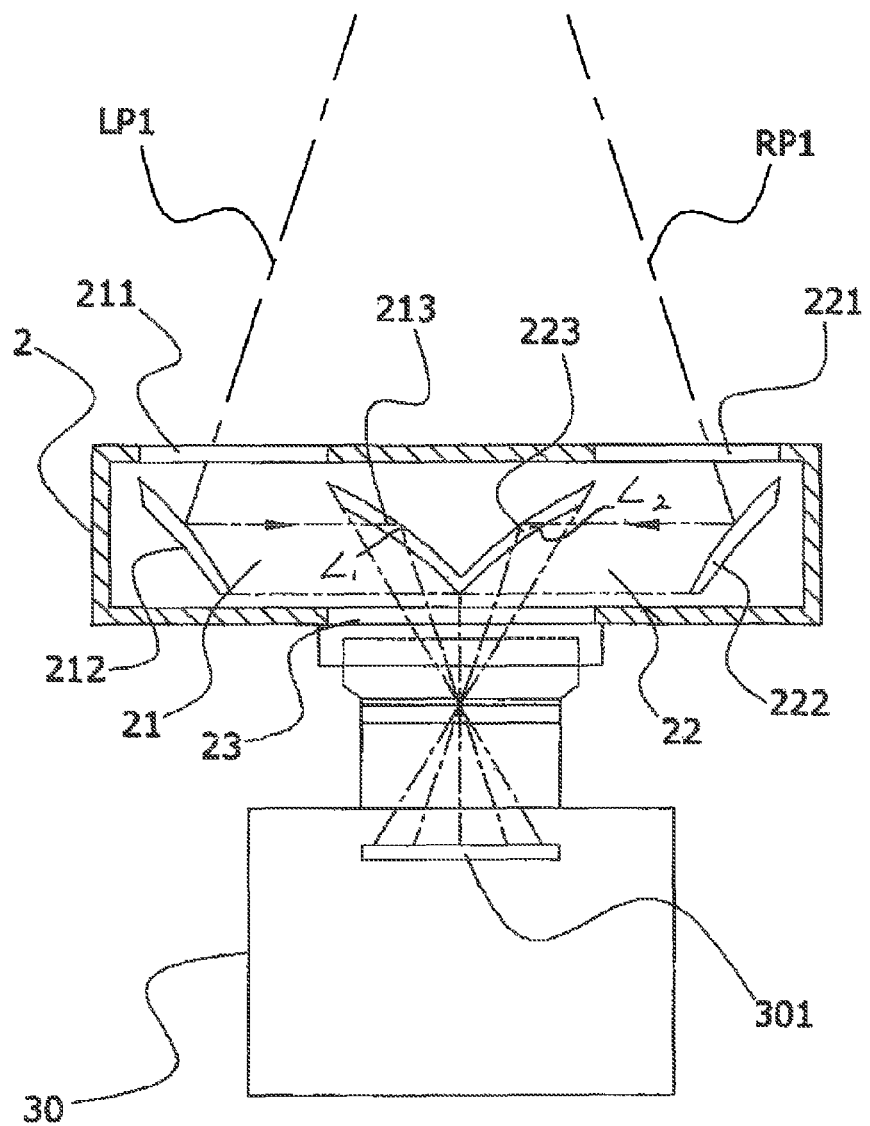
FIG. 7 is a schematic view of optical paths during the implementation of the present invention.

FIG. 5 is a schematic view I of the implementation of the present invention. Referring to FIG. 5, the present invention may be installed in front of an imaging device 30. The imaging device may be a single-lens reflex camera or a video camera. After the installation, the central image inlet 23 corresponds to an image sensor 301 of the imaging device 30, for example, a charge-coupled device (CCD) or a complementary metal-oxide-semiconductor (CMOS). FIG. 6 is a schematic view II of the implementation of the present invention. Referring to FIG. 6, a scene 40 to be shot is located between the TPCR with focal length and disparity control 2 and the convergence point 50 which is the intersection point of the view direction (or, optical center) of the left side reflecting unit 50L and view direction (or, optical center) of the right side reflecting unit 50R. The angle between these two view directions is called the convergence angle. When an operator shoots the scene 40, after being captured, a left side view image LP1 of the shot scene 40 enters from the left side image inlet 211 of the left side imaging channel 21, and a right side view image RP1 of the scene 40 enters from the right side image inlet 221 of the right side imaging channel 22. FIG. 7 is a schematic view of optical paths during the implementation of the present invention. Referring to FIG. 7, upon reaching the left side outward reflecting unit 212, the left side view image LP1 is parallelly reflected to the left side inward reflecting unit 213, and is then reflected by the left side inward reflecting unit 213 to enter the imaging device 30 from the central image inlet 23. In addition, upon reaching the right side outward reflecting unit 222, the right side view image RP1 is parallelly reflected to the right side inward reflecting unit 223, and is then reflected by the right side inward reflecting unit 223 to enter the imaging device 30 from the central image inlet 23. According to the above, the image sensor 301 of the imaging device 30 may synchronously obtain the left side view image LP1 and the right side view image RP1 accordingly.

Figure 8:
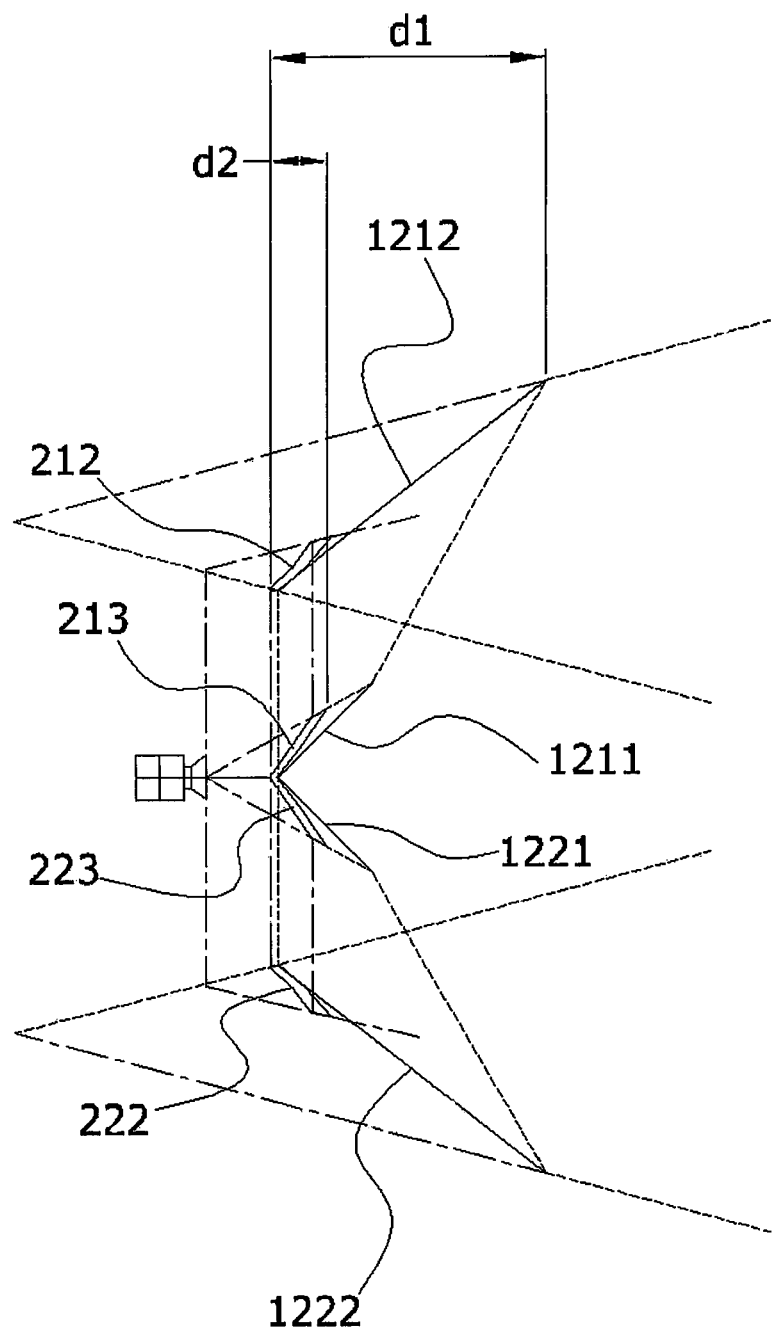
FIG. 8 is a schematic comparison view of the present invention and the prior art.

FIG. 8 is a schematic comparison view of the present invention and the prior art. Referring to FIG. 8, a prior two-channel reflector 12 is formed by several flat reflecting mirrors (including a left side inward mirror 1211, a left side outward mirror 1212, a right side inward mirror 1221, and a right side outward mirror 1222), while the present invention is formed by several curved reflecting mirrors (including a left side inward reflecting unit 213, a left side outward reflecting unit 212, a right side inward reflecting unit 223 and a right side outward reflecting unit 222). As shown in FIG. 8, when the same scene shooting condition is achieved (for example, the maximum focal length range), the overall thickness of the physical structure of the prior two-channel reflector 12 is d1, while the overall thickness of the physical structure of the present invention is d2. In comparison, the dimension of the physical structure of the present invention may meet the requirements for miniaturization, and the main reason is that the left side imaging channel 21 and the right side imaging channel 22 formed by curved reflecting mirrors (including the left side inward reflecting unit 213, the left side outward reflecting unit 212, the right side inward reflecting unit 223, and the right side outward reflecting unit 222) enable incoming light rays to be parallelly reflected within the imaging channels, while the prior two-channel reflector 12 causes radiating reflection. Accordingly, unlike the prior two-channel reflector 12 where the dimension of the outward mirrors is proportional to the distance to the inward mirrors, the dimension of the outward reflecting units of the present invention is the same as the dimension of the inward reflecting units, independent of the distance between the outward reflecting units and the inward reflecting units, so that minimizing the dimension of a TPCR is just a matter of minimizing the dimension of the inward reflecting units.

Figure 9:
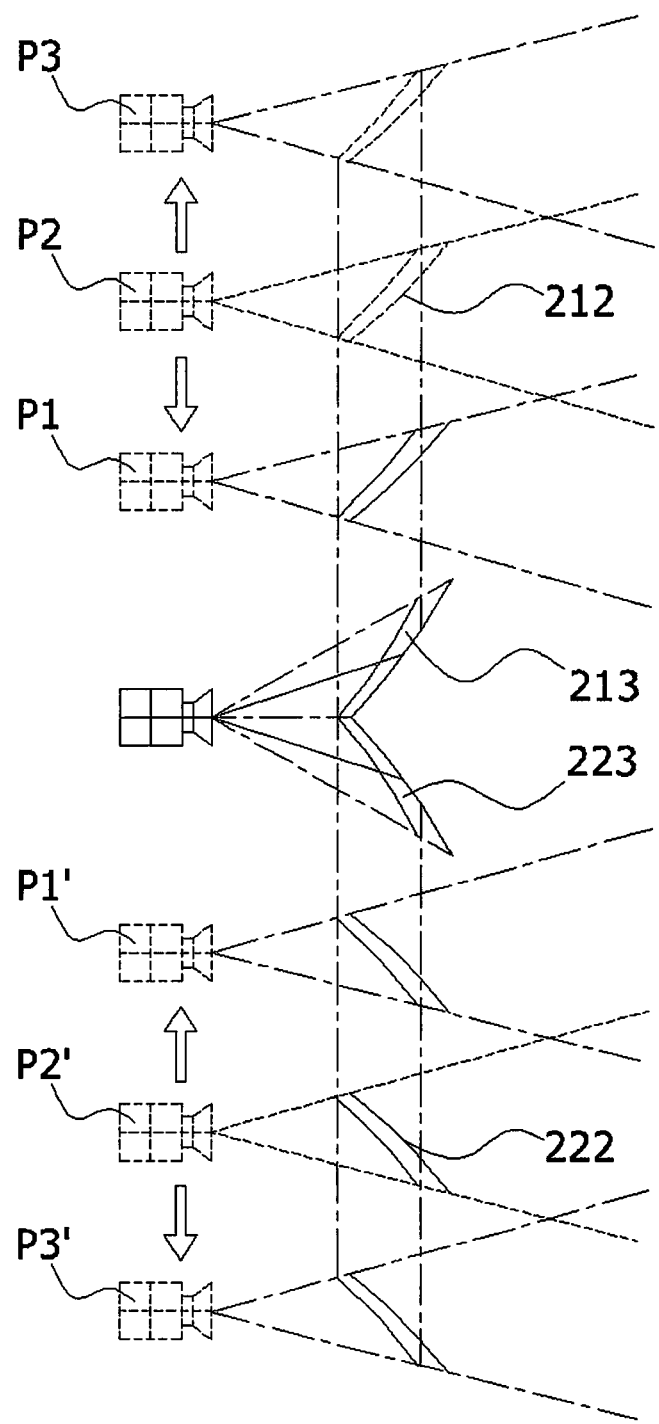
FIG. 9 shows another preferred embodiment I of the present invention.

FIG. 9 shows another preferred embodiment I of the present invention. Referring to FIG. 9, the left side outward reflecting unit 212 and the right side outward reflecting unit 222 of the present invention may be further designed to include a distance adjusting mechanism, so that the interocular distance between the left side outward reflecting unit 212 and the right side outward reflecting unit 222 can be adjusted synchronously. Therefore, in the present invention, when the imaging operation is performed, a disparity control function may be provided. As shown in FIG. 9, through the control of the operator, the interocular distance between the left side outward reflecting unit 212 and the right side outward reflecting unit 222 may be changed to be smaller or bigger, please refer to the shift adjustment (P1-P3, P1'-P3') of positions as shown in FIG. 9. Further, the distance adjusting mechanism may be of a mechanical type, an electronic type, or a combination thereof.

Figure 10:
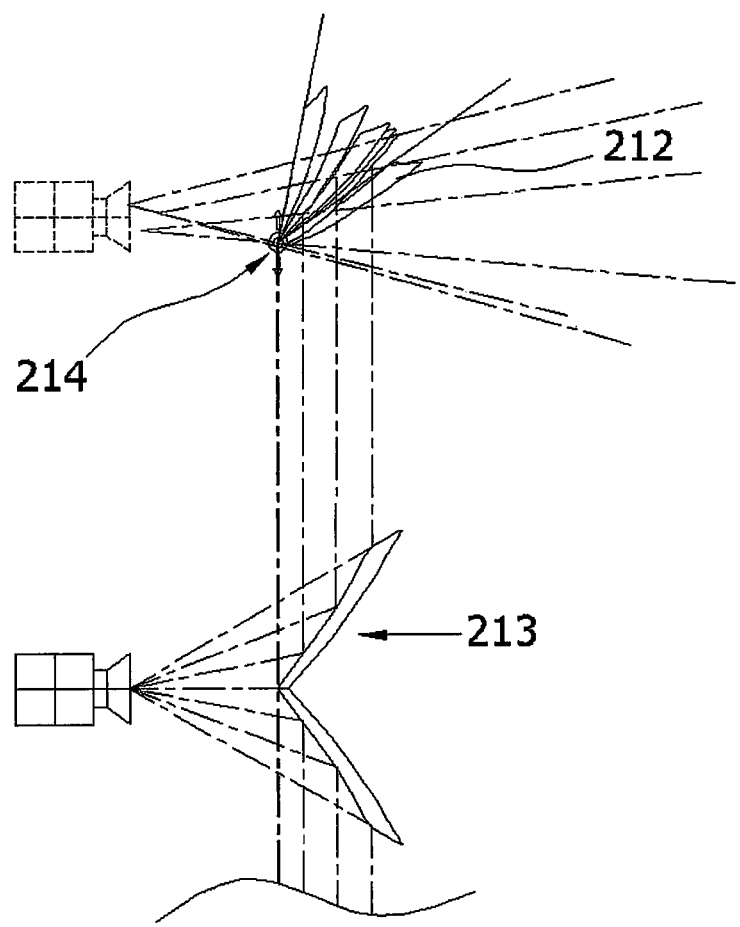
FIG. 10 shows another preferred embodiment II of the present invention.

FIG. 10 shows another preferred embodiment II of the present invention. Referring to FIG. 10, the left side outward reflecting unit 212 and the right side outward reflecting unit 222 of the present invention may be further designed to be a mechanism capable of controlling a deflection angle, so that the operator may adjust the convergence angle and, consequently, control the focal length during imaging. As shown in FIG. 10, the left side outward reflecting unit 212 of the present invention may be assembled to a rotating shaft 214, and a second control device (not shown in FIG. 10) may be used together, so that the operator may operate the second control device to enable the left side outward reflecting unit 212 to deflect around the rotating shaft 214 during imaging, so as to change the view direction 50L (please refer to FIG. 6 for 50L) of the left side outward reflecting unit 212, and do the same to the structure of the right side outward reflecting unit 222 synchronously, thereby achieving a function of controlling the focal length during imaging by adjusting the convergence angle between the view direction 50L of the left side outward reflecting unit and view direction 50R of the right side outward reflecting unit.

Figure 11:
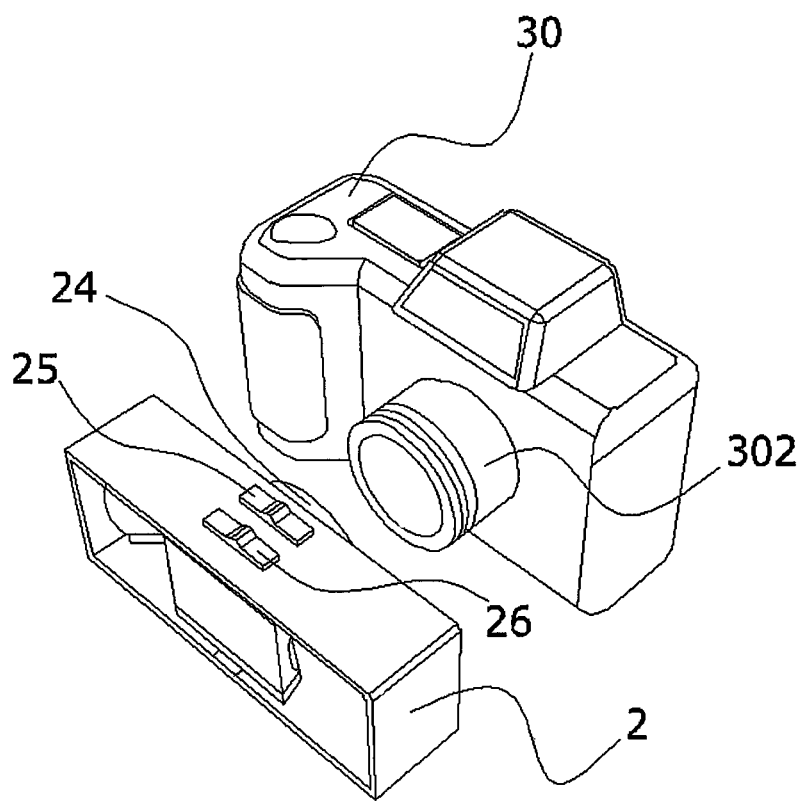
FIG. 11 is a three-dimensional outside view of a finished product of the present invention.

FIG. 11 is a three-dimensional outside view of a finished product of the present invention. Referring to FIG. 11, the present invention is capable of being assembled in front of a lens 302 of the imaging device 30. On the physical appearance of the present invention, an assembly ring 24 may be shaped, so as to be quickly assembled to the lens 302. Further, a first control device 25 is further constructed, for actuating the distance adjusting mechanism (please refer to the description of FIG. 9), so as to actuate the left side outward reflecting unit 212 and the right side outward reflecting unit 222 to shift synchronously after being operated, so that the operator may adjust the disparity during imaging. Further, a second control device 26 is further constructed, which, after being operated, may drive the left side outward reflecting unit 212 and the right side outward reflecting unit 222 to deflect synchronously, so as to change the convergence angle (please refer to FIG. 6 and the description thereof), so that the operator may adjust the focal length during imaging. Further, the second control device 26 may be of a mechanical type, an electronic type, or a combination thereof, for actuating the rotating shaft 214.

Based on the above, in the present invention, a plurality of curved reflecting mirrors constructs a TPCR, so that the reflector may synchronously capture a left side view image and a right side view image of a scene to an imaging device, and control the interocular distance and the convergence angle to control the disparity and focal length during the image capturing process. As the curved reflecting mirrors in the present invention may enable the light rays to be parallelly transmitted in the two parallel channels, the interocular distance and the convergence angle may be adjusted. Accordingly, after being implemented, the present invention at least has the following two advantages.

(1) The light rays are parallelly reflected between the outward reflecting unit and the inward reflecting unit in each channel. No matter whether a great or small disparity is required, in the present invention, it is only necessary to use an outward reflecting unit having the same size as the inward reflecting unit, so that under the same disparity range condition, the thickness of the finished product of the present invention is smaller than any prior similar device using flat reflecting mirrors, and it is estimated that the thickness and height may be each reduced by ⅔. With the specific miniaturized result, the present invention may be quickly assembled in front of, for example, the lens of a single-lens reflex camera, or may be even embedded into a frame of a display of a computer, which facilitates the application of the present invention to image capturing and 3D imaging.

(2) The positions of the outward reflecting units may be shifted, and the view directions of the outward reflecting units may be adjusted, so that during the image capturing process, the user may implement the operation of controlling the disparity and focal length by using the present invention.

Therefore, after the present invention is implemented accordingly, the objective of providing a TPCR with focal length and disparity control that is capable of being miniaturized and controlling the disparity and focal length can surely be achieved.

The above descriptions are merely preferred embodiments of the present invention, but are not intended to limit the protection scope of the present invention. Any modification, equivalent replacement, and improvement made by persons skilled in the art without departing from the spirit and scope of the present invention shall fall within the protection scope of the present invention.

What is claimed is:

1. A two-parallel-channel reflector (TPCR) with focal length and disparity control, assembled to an imaging device, so that the imaging device is capable of synchronously capturing a left side view image and a right side view image of a scene, the TPCR comprising:
    a left side imaging channel constructed by a left side image inlet, a left side outward reflecting unit formed by a curved reflecting mirror, and a left side inward reflecting unit formed by a curved reflecting mirror, wherein an end of the left side imaging channel is connected to a central image inlet; and
    a right side imaging channel constructed by a right side image inlet, a right side outward reflecting unit formed by a curved reflecting mirror, and a right side inward reflecting unit formed by a curved reflecting mirror, wherein an end of the right side imaging channel is connected to the central image inlet;
    the left side and the right side imaging channels being configured whereby the left side view image enters from the left side image inlet, reaches the left side outward reflecting unit, is parallelly reflected to the left side inward reflecting unit, is reflected by the left side inward reflecting unit, and enters the imaging device from the central image inlet, the right side view image enters from the right side image inlet, reaches the right side outward reflecting unit, is parallelly reflected to the right side inward reflecting unit, is reflected by the right side inward reflecting unit, and enters the imaging device from the central image inlet;
    further wherein a parallel reflecting path is defined for each of the left side view and right side view images reflected from the left side and right side outward reflecting units to the left side and right side inward reflecting units.

2. The TPCR with focal length and disparity control according to claim 1, wherein the imaging device has an image sensor.

3. The TPCR with focal length and disparity control according to claim 2, wherein the image sensor is a charge-coupled device (CCD).

4. The TPCR with focal length and disparity control according to claim 2, wherein the image sensor is a complementary metal-oxide-semiconductor (CMOS).

5. The TPCR with focal length and disparity control according to claim 1, wherein there is a distance adjusting mechanism, capable of synchronously adjusting an interocular distance between the left side outward reflecting unit and the right side outward reflecting unit.

6. The TPCR with focal length and disparity control according to claim 5, wherein the distance adjusting mechanism is of a mechanical type, an electronic type, or a combination thereof.

7. The TPCR with focal length and disparity control according to claim 5, wherein the distance adjusting mechanism is actuated by a first control device.

8. The TPCR with focal length and disparity control according to claim 1, wherein there is an angle adjusting mechanism, capable of synchronously adjusting a convergence angle between the optical center of the left side outward reflecting unit and the optical center of the right side outward reflecting unit, by synchronously rotating the left side outward reflecting unit and the right side outward reflecting unit about respective left and right rotating shafts inward or outward.

9. The TPCR with focal length and disparity control according to claim 8, wherein the angle adjusting mechanism is actuated by a second control device.

10. The TPCR with focal length and disparity control according to claim 9, wherein the second control device is of a mechanical type, an electronic type, or a combination thereof, for actuating the rotating shaft to rotate.

11. The TPCR with focal length and disparity control according to claim 9, wherein an included angle is formed between a view direction of the left side outward reflecting unit and the central image inlet, and the left side outward reflecting unit is assembled to the left rotating shaft, so that the left side outward reflecting unit is capable of deflecting around the left rotating shaft, so as to change the included angle.

12. The TPCR with focal length and disparity control according to claim 11, wherein the left rotating shaft is actuated by the second control device.

13. The TPCR with focal length and disparity control according to claim 12, wherein the second control device is of a mechanical type, an electronic type, or a combination thereof, for actuating the left rotating shaft to rotate.

14. The TPCR with focal length and disparity control according to claim 9, wherein an included angle is formed between a view direction of the right side outward reflecting unit and the central image inlet, and the right side outward reflecting unit is assembled to the right rotating shaft, so that the right side outward reflecting unit is capable of deflecting around the right rotating shaft, so as to change the included angle.

15. The TPCR with focal length and disparity control according to claim 11, wherein the right rotating shaft is actuated by the second control device.

16. The TPCR with focal length and disparity control according to claim 15, wherein the second control device is of a mechanical type, an electronic type, or a combination thereof, for actuating the rotating shaft to rotate.

* * * * *